(12) United States Patent
Hamatani (10) Patent No.: US 10,639,858 B2
(45) Date of Patent: May 5, 2020

(54) FLAT-TIRE REPAIR KIT

(71) Applicant: BRIDGESTONE CORPORATION, Tokyo (JP)

(72) Inventor: Mitsuyoshi Hamatani, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 61 days.

(21) Appl. No.: 15/777,308

(22) PCT Filed: Nov. 1, 2016

(86) PCT No.: PCT/JP2016/082394
§ 371 (c)(1),
(2) Date: May 18, 2018

(87) PCT Pub. No.: WO2017/098835
PCT Pub. Date: Jun. 15, 2017

(65) Prior Publication Data
US 2018/0333928 A1 Nov. 22, 2018

(30) Foreign Application Priority Data
Dec. 8, 2015 (JP) .................................. 2015-239560

(51) Int. Cl.
  *B29C 73/16* (2006.01)
  *B60S 5/04* (2006.01)
  (Continued)

(52) U.S. Cl.
  CPC .......... *B29C 73/166* (2013.01); *B29C 73/025* (2013.01); *B60S 5/04* (2013.01); *B29L 2030/00* (2013.01)

(58) Field of Classification Search
  USPC ......................................................... 141/38
  See application file for complete search history.

(56) References Cited

U.S. PATENT DOCUMENTS 5,012,954 A * 5/1991 Will ........................ B60C 23/10
141/330
6,735,170 B1 * 5/2004 Roberts .................. H04J 3/1611
370/230
(Continued)

FOREIGN PATENT DOCUMENTS

CN 201198199 Y 2/2009
CN 201483775 U 5/2010
(Continued)

OTHER PUBLICATIONS

Extended European Search Report dated Nov. 20, 2018 issued by the European Patent Office in counterpart application No. 16872735.2.

(Continued)

*Primary Examiner* — Mary E McManmon
*Assistant Examiner* — James R Hakomaki
(74) *Attorney, Agent, or Firm* — Sughrue Mion, PLLC (57) ABSTRACT

A flat-tire repair kit of the present invention is provided with a bottle, and a bottle attachment part, wherein a bottle opening part has a sealing member that seals a liquid agent inside the bottle, the bottle opening part or the bottle attachment part has a seal member that establishes liquid-tight connection after the start of relative rotation, the bottle attachment part has a seal-breaking protrusion part that comes in contact with the sealing member to break a seal after the start of establishment of the liquid-tight connection by the seal member, and the bottle opening part engages an attachment-side engaging part of the bottle attachment part after the breakage of the seal of the seal member by the seal-breaking protrusion part to prevent the bottle opening part from performing relative rotation in an opposite rotating direction with respect to the bottle attachment part.

19 Claims, 6 Drawing Sheets

(51) Int. Cl.
*B29C 73/02* (2006.01)
*B29L 30/00* (2006.01)

(56) References Cited

U.S. PATENT DOCUMENTS

| | | | | |
|---|---|---|---|---|
| 8,201,586 B2* | 6/2012 | Yoshida | ............... | B29C 73/166 141/105 |
| 8,342,215 B2* | 1/2013 | Sekiguchi | ............ | B29C 73/166 141/114 |
| 8,453,683 B2* | 6/2013 | Yoshida | ............... | B29C 73/166 141/105 |
| 8,459,150 B2* | 6/2013 | Yoshida | ............... | B29C 73/166 141/192 |
| 8,752,595 B2* | 6/2014 | Marini | ................. | B29C 73/166 141/38 |
| 2004/0173282 A1* | 9/2004 | Laetgaard | ............ | B29C 73/166 141/38 |
| 2004/0216806 A1 | 11/2004 | Eckhardt | | |
| 2009/0241738 A1 | 10/2009 | Naito | | |
| 2010/0108185 A1 | 5/2010 | Chou | | |
| 2011/0290372 A1 | 12/2011 | Dowel | | |
| 2015/0000786 A1 | 1/2015 | Taniguchi et al. | | |

FOREIGN PATENT DOCUMENTS

| | | | | |
|---|---|---|---|---|
| CN | 102744894 A | 10/2012 | | |
| CN | 104039537 A | 9/2014 | | |
| DE | 20212101 U1 | 2/2003 | | |
| DE | 102005019766 A1 | 11/2006 | | |
| DE | 102005019770 A1 * | 11/2006 | ........... | B29C 73/166 |
| DE | 102005021073 A1 * | 11/2006 | ........... | B29C 73/166 |
| JP | 2007-176181 A | 7/2007 | | |
| JP | 2009255538 A | 11/2009 | | |
| JP | 2012-514548 A | 6/2012 | | |
| JP | 2014-046574 A | 3/2014 | | |
| JP | 2015-089650 A | 5/2015 | | |
| WO | WO-2009154087 A1 * | 12/2009 | ........... | B29C 73/166 |

OTHER PUBLICATIONS

International Search Report for PCT/JP2016/082394, dated Jan. 31, 2017.

Search Report dated Aug. 5, 2019 from the State Intellectual Property Office of the P.R.C. in application No. 2016800719017.

* cited by examiner

FLAT-TIRE REPAIR KIT

This application is a National Stage of International Application No. PCT/JP2016/082394 filed Nov. 1, 2016, which claims priority based on Japanese Patent Application No. 2015-239560filed Dec. 8, 2015.

TECHNICAL FIELD

The present disclosure relates to a flat-tire repair kit.

BACKGROUND

A variety of flat-tire repair kits have been proposed for repairing a flat tire by injecting a flat-tire repair solution into the tire to close the puncture hole that caused the flat tire. By closing the puncture hole with such a flat-tire repair kit and then increasing the internal pressure to a predetermined air pressure, the repaired tire can be used again for at least a certain period of time without being replaced.

In one such flat-tire repair kit, a bottle containing a flat-tire repair solution is used by being connected to a bottle attachment portion, provided on the mounting side where the solution is injected into the tire. The bottle is connected by being screwed into the bottle attachment portion; for example, see patent literature (PTL) 1.

CITATION LIST

Patent Literature

PTL 1: JP 2014-046574 A

SUMMARY

Technical Problem

With such a screw-type flat-tire repair kit, a sealing member provided on the opening of the bottle can be broken by screwing the bottle into the bottle attachment portion, and by starting a compressor in the flat-tire repair kit, the flat-tire repair solution can be injected into the tire from the opening through the bottle attachment portion.

However, while screwing the bottle onto the bottle attachment portion, the user of the flat-tire repair kit does not know for sure whether the bottle has been screwed on completely, for example, and may therefore use the flat-tire repair kit before screwing is complete or may feel uncertain about the state of screwing. In this case, the solution could leak from between the bottle and the bottle attachment portion, or in order to re-screw the bottle, the user might try to detach the bottle by twisting in the opposite direction from the screwing rotation direction. The flat-tire repair solution particularly runs the risk of leaking when the user tries to detach the bottle once its sealing member has already been broken.

Therefore, it is an aim of the present disclosure to provide a flat-tire repair kit that can increase the reliability of the connection when connecting the bottle to the bottle attachment portion.

Solution to Problem

A flat-tire repair kit according to the present disclosure comprises:

a bottle containing a flat-tire repair solution; and a bottle attachment portion to which a bottle opening of the bottle is connectable by being relatively rotated to screw the bottle opening and the bottle attachment portion together; wherein the bottle opening includes a sealing member configured to seal the solution inside the bottle, the bottle opening or the bottle attachment portion includes a seal member configured to make a connection of the bottle opening to the bottle attachment portion liquid-tight after the bottle opening starts to be rotated relative to the bottle attachment portion, the bottle attachment portion includes a sealing-breaker projection configured to contact and break the sealing member after the seal member starts to make the connection liquid-tight, and the bottle opening includes a bottle-side engagement portion configured to engage with an attachment-side engagement portion, included in the bottle attachment portion, after the sealing-breaker projection breaks the sealing member, so as to prevent the bottle opening from relatively rotating in an opposite rotation direction from a rotation direction when the bottle opening is screwed onto the bottle attachment portion.

In the present disclosure, "to make a connection of the bottle opening to the bottle attachment portion liquid-tight" means that a seal is formed so that if solution flows out from inside the bottle while the bottle opening is being connected to the bottle attachment portion or after connection is complete, the solution is prevented from passing through a gap between the bottle opening and the bottle attachment portion and leaking to the outside of the space formed between the bottle opening and the bottle attachment portion.

In the present disclosure, "torque" can be measured with a torque meter. Specifically, torque can be measured by, for example, fixing the bottle attachment portion, connecting a torque meter to the bottle, and relatively rotating the torque meter.

Advantageous Effect

According to the present disclosure, a flat-tire repair kit that can increase the reliability of the connection when connecting the bottle to the bottle attachment portion can be provided.

DETAILED DESCRIPTION

The following describes an embodiment of the present disclosure in detail with reference to the drawings.

Figure 1A:
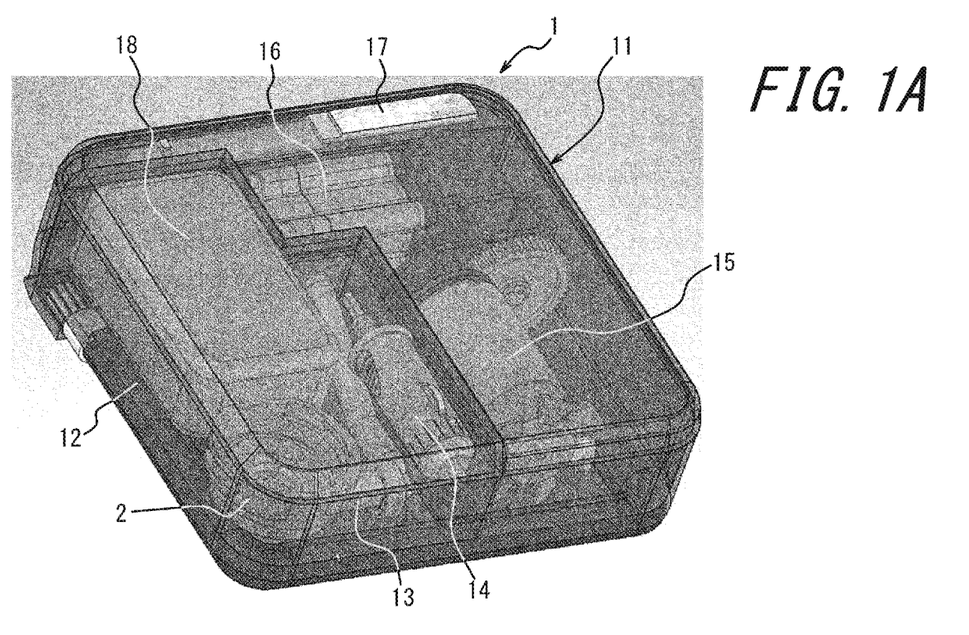
FIG. 1A is a perspective view transparently illustrating a portion of the structural elements of a flat-tire repair kit according to an embodiment of the present disclosure.
Figure 1B:
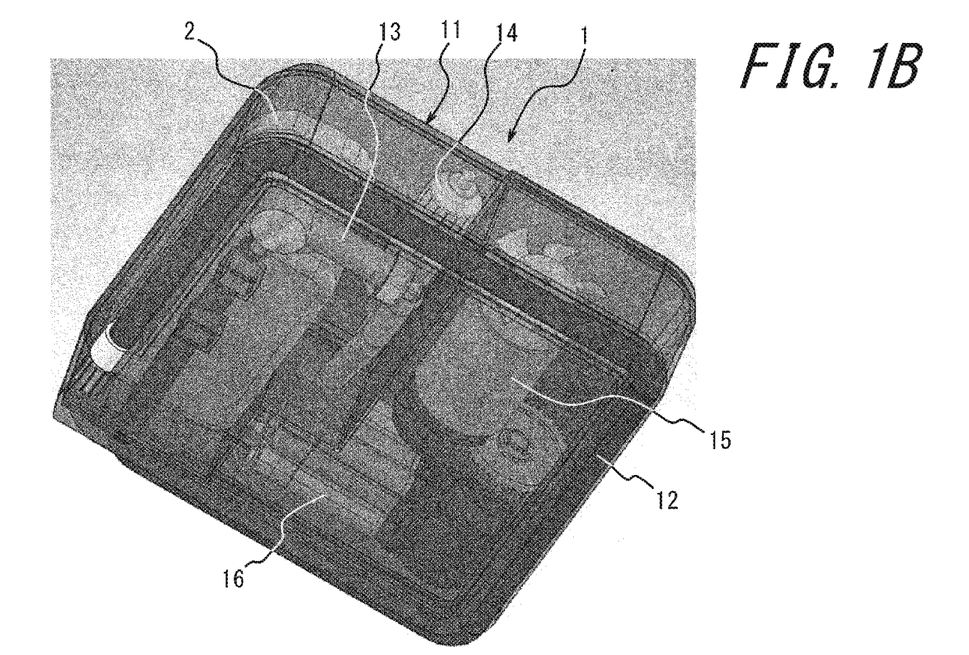
FIG. 1B is a perspective view transparently illustrating a portion of the structural elements of the flat-tire repair kit according to an embodiment of the present disclosure from a different angle than in FIG. 1A.

FIGS. 1A and 1B are perspective views transparently illustrating a portion of the structural elements of a flat-tire repair kit 1 according to an embodiment of the present disclosure from different angles. As illustrated in FIGS. 1A and 1B, the flat-tire repair kit 1 according to the present embodiment is for injecting a flat-tire repair solution into a tire that has gone flat to close the puncture hole that caused the flat tire, thereby allowing the repaired tire to be used again for at least a certain period of time.

This flat-tire repair kit 1 includes a pressure resistant hose 12, a bottle attachment portion 2, a connecting pipe 13, a cigar plug 14, a motor 15, a cylinder 16, a gauge 17, and a cable storage space 18, all stored in the case 11 in the state illustrated in the figures.

Figure 2:
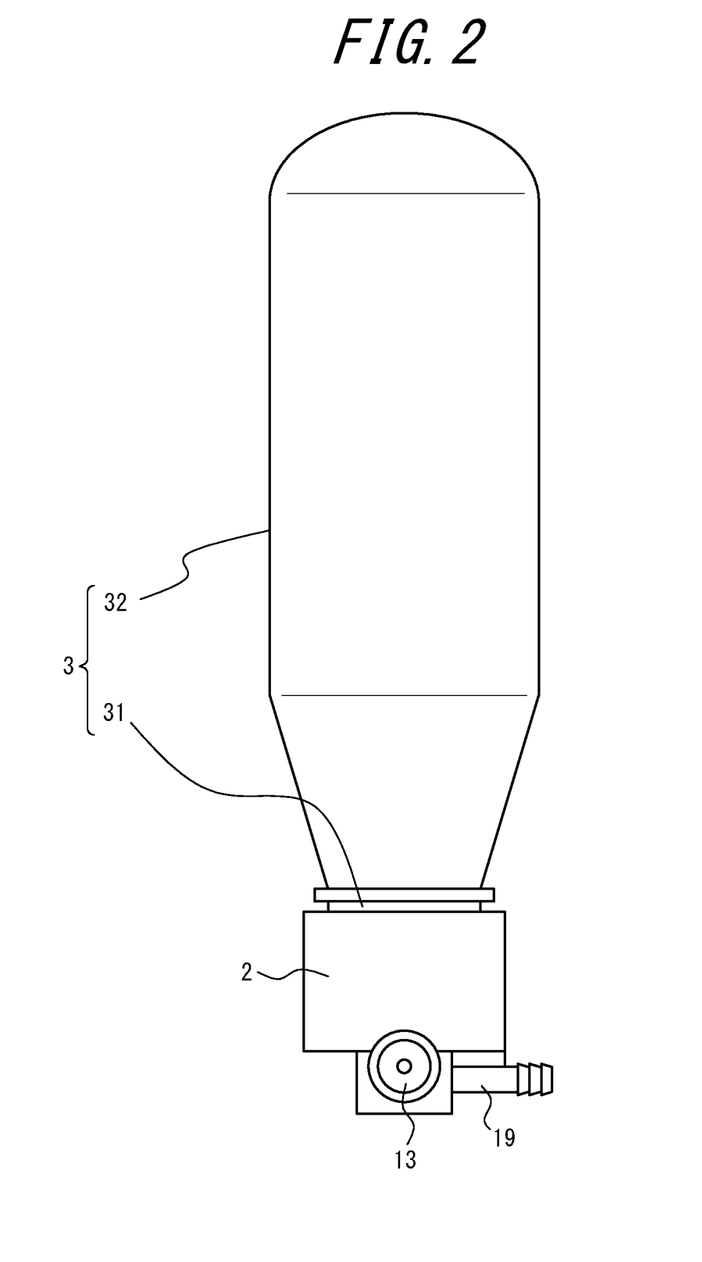
FIG. 2 illustrates a connection state in which the bottle and the bottle attachment portion of the flat-tire repair kit according to an embodiment of the present disclosure are screwed together.

As illustrated in FIG. 2, this flat-tire repair kit 1 also includes a bottle 3, provided separately here, for connection to the bottle attachment portion 2 stored in the case 11. For ease of understanding, FIG. 2 and FIGS. 3 through 6B below are partial cutaways to allow the internal structure to be grasped.

The pressure resistant hose 12 is a hose for injecting air compressed by the below-described cylinder 16 and flat-tire repair solution into a tire by connecting one end of the hose to a tire valve (not illustrated).

As illustrated in FIG. 1A, FIG. 1B, and FIG. 2, the bottle attachment portion 2 is configured for the bottle 3, which contains the flat-tire repair solution, to be connectable. The bottle attachment portion 2 includes (a portion of) the connecting pipe 13 and includes a hose connector 19.

Figure 3:
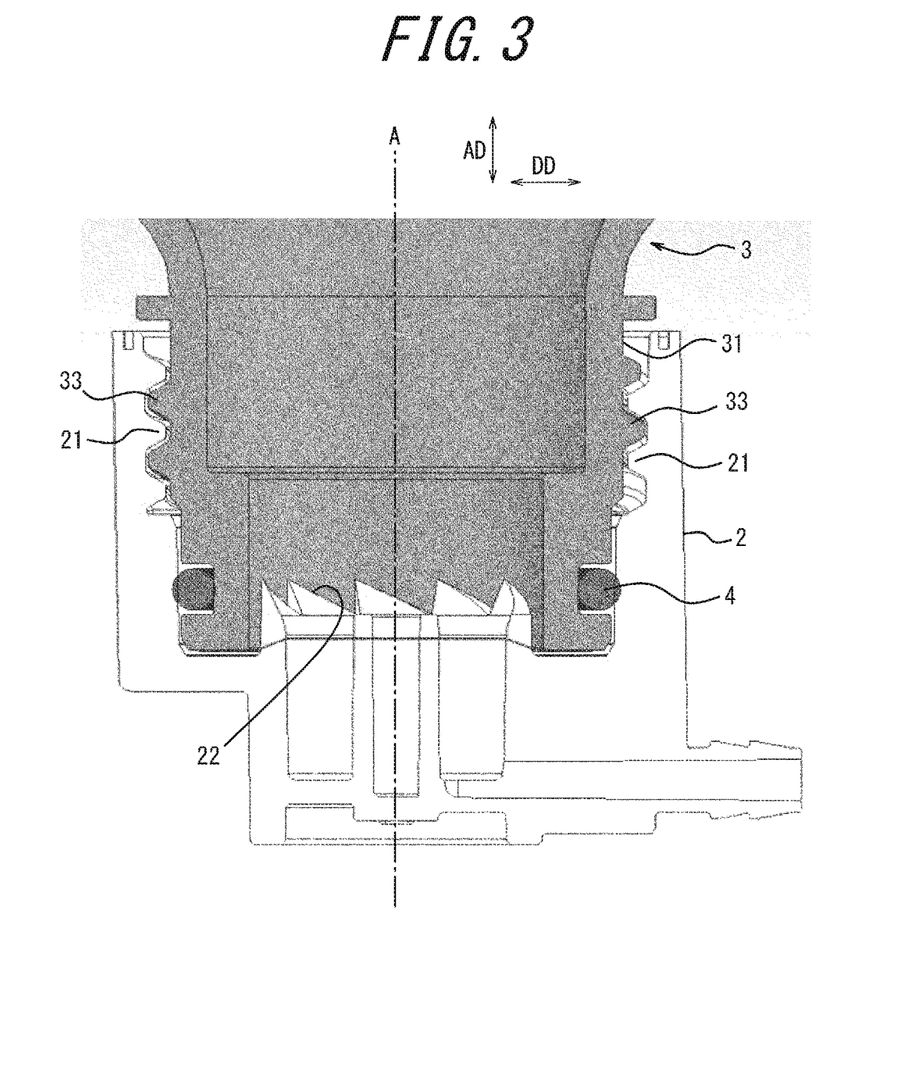
FIG. 3 is a cross-sectional diagram in the rotation axis direction of the flat-tire repair kit in FIG. 2, illustrating an enlargement of the bottle opening and the bottle attachment portion in a completely connected state.

Furthermore, as illustrated in FIG. 3, the inside of the bottle attachment portion 2 is convex so that the below-described bottle opening 31 can be connected, at the outer surface thereof in this example, to the bottle attachment portion 2 by screwing.

In the example illustrated in FIG. 2, the bottle 3 has a cylindrical main body 32 with a bottom and the bottle opening 31 provided at one end of the main body 32. The main body 32 and the bottle opening 31 are, for example, formed integrally from synthetic resin and can be manufactured by injection blow molding to heat/soften and inflate an injection molded preform, or by direct blow molding to inflate a melted, cylindrical parison. The main body 32 of the bottle 3 contains a flat-tire repair solution in an amount determined in accordance with the type of tire. The solution has, for example, rubber latex as the main component and a high viscosity of around 40 cps (20° C.).

As illustrated in FIG. 2 and the like, the bottle opening 31 of the bottle 3 is cylindrical. In this example, the bottle opening 31 of the bottle 3 is inserted inside the convex bottle attachment portion 2 and is screwed on by being rotated relative to the bottle attachment portion 2 in a predetermined direction, thereby allowing the bottle 3 to be connected to the bottle attachment portion 2.

The cigar plug 14 illustrated in FIG. 1A and FIG. 1B receives power by a power cable connected to the cigar plug 14 being inserted into the power socket of a vehicle. This power rotates a motor 15, and the rotational motion is converted into reciprocating motion of the cylinder 16. Compressed air can thus be created by the reciprocating motion of the cylinder 16.

The bottle attachment portion 2 and the cylinder 16 are connected by the connecting pipe 13, and the compressed air from the cylinder 16 can flow through the connecting pipe 13 and into the bottle 3 connected to the bottle attachment portion 2.

The compressed air flowing into the bottle 3 can inject the flat-tire repair solution into the tire and also increase the internal pressure of the tire.

After the air pressure of the tire is increased to a predetermined value, the pressure resistant hose 12 is removed from the tire, and the vehicle is taken on a preliminary drive. Once the preliminary drive is finished, the tire air pressure is confirmed with the gauge 17, and as necessary, compressed air is generated again with the cylinder 16 and injected into the tire to raise the internal pressure of the tire to a predetermined air pressure.

The cable storage space 18 is a space for storing the power cable connected to the cigar plug 14. While omitted from the drawings, the power cable is stored by being wound inside the cable storage space 18.

In the flat-tire repair kit 1 of the present embodiment, as described above, the bottle 3 is connected to the bottle attachment portion 2 by rotating the bottle opening 31 of the bottle 3 relative to the bottle attachment portion 2 to screw the bottle opening 31 and the bottle attachment portion 2 together. The bottle opening 31 of the bottle 3 and the bottle attachment portion 2 are described below in further detail.

The rotation axis A of the rotation of the bottle opening 31 relative to the bottle attachment portion 2 is also referred to as the "rotation axis", the direction parallel to the rotation axis A as the "rotation axis direction AD" (the direction in which the bottle opening 31 is connected to the bottle attachment portion 2), the direction orthogonal to the rotation axis direction AD as the "radial direction DD", and the direction parallel to the relative rotation as the "circumferential direction". When the bottle opening 31 is connected to the bottle attachment portion 2, the directions towards the bottle opening 31 side and the bottle attachment side of the rotation axis direction AD are also referred to respectively as the "opening side in the rotation axis direction" and the "attachment side in the rotation axis direction".

In this example, the bottle opening 31 has a bottle-side screw portion 33 (with a three-threaded screw shape in the illustrated example) formed as a spiral on the outer circumferential surface of the bottle opening 31 at a position separated from the open end of the bottle opening 31 towards the opening side in the rotation axis direction AD, as illustrated in FIG. 3. The bottle attachment portion 2 has an attachment-side screw portion 21 corresponding to the bottle-side screw portion 33, formed as a spiral near the open end of the bottle attachment portion 2, on the inner circumferential surface of the bottle attachment portion 2 (the inner side of the bottle attachment portion 2).

The bottle opening 31 has a sealing member 34 (illustrated in FIG. 6B, for example) for sealing the solution inside the bottle 3. In this example, the sealing member 34 is constituted by an aluminum sheet at the open end of the bottle opening 31 and is provided to cover the open end. While an aluminum sheet is used as the sealing member 34 in this example, a resin film that includes rubber can also be used. Since FIG. 3 illustrates the state after the sealing member 34 has been broken, the sealing member 34 is not illustrated in FIG. 3.

As illustrated in FIG. 3, the bottle opening 31 or the bottle attachment portion 2 includes a seal member 4. The seal member 4 makes the connection between the bottle opening 31 and the bottle attachment portion 2 liquid-tight after rotation of the bottle opening 31 relative to the bottle attachment portion 2 starts (after screwing starts). In other words, when the solution flows out from the bottle 3, the seal member 4 prevents the solution from passing through the gap between the bottle-side screw portion 33 and the attachment-side screw portion 21 and leaking outside the bottle opening 31.

In the illustrated example, the seal member 4 is included in the bottle opening 31. Specifically, the seal member 4 is provided on the outer circumferential surface between the open end of the bottle opening 31 and the bottle-side screw portion 33. In greater detail, the seal member 4 is an O-ring attached to a groove provided around the outer circumferential surface of the bottle opening 31. In the case of the seal member 4 being provided on the bottle opening 31, the inner circumferential surface of the bottle attachment portion 2 at a position separated from the open end of the bottle attachment portion 2 towards the attachment side in the rotation axis direction AD, specifically the inner circumferential surface of the bottle attachment portion 2 between the attachment-side screw portion 21 and the below-described sealing-breaker projections 22 of the bottle attachment portion 2, is a smooth surface on which the seal member 4 easily slides and to which the seal member 4 closely adheres.

The seal member 4 may also be included in the bottle attachment portion 2 or included in both the bottle opening 31 and the bottle attachment portion 2.

Figure 4A:
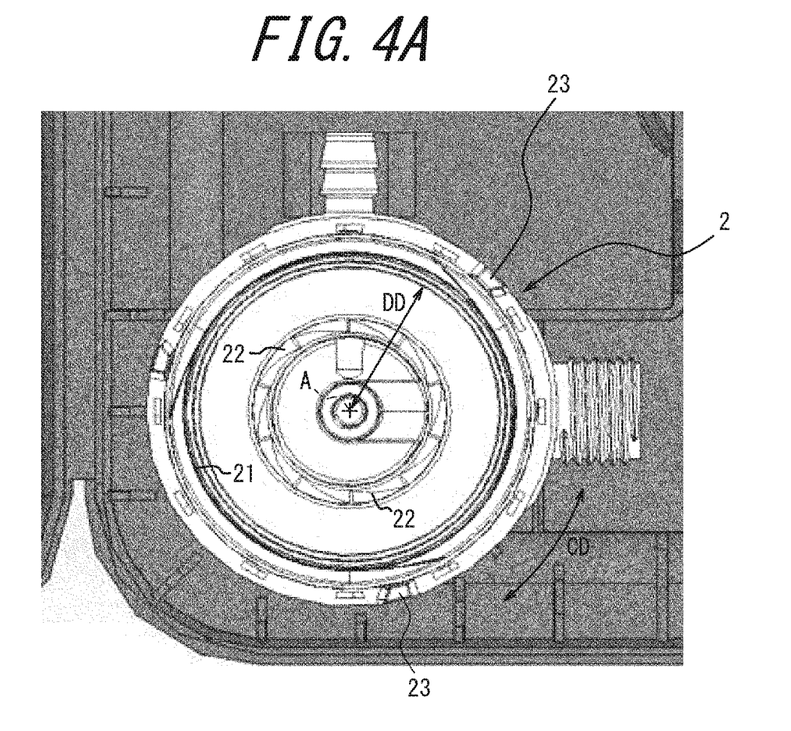
FIG. 4A illustrates the bottle attachment portion of the flat-tire repair kit in FIG. 2 from the rotation axis direction, and FIG. 4B schematically illustrates an enlargement of sealing-breaker projections of the bottle attachment portion in FIG. 4A from a direction orthogonal to the rotation axis direction.

The bottle attachment portion 2 includes sealing-breaker projections 22 for coming into contact with and breaking the sealing member 34 provided on the bottle opening 31. Specifically, a plurality of sealing-breaker projections 22 is provided on the inner bottom of the bottle attachment portion 2 at positions corresponding to the opening surface of the bottle opening 31 when the bottle opening 31 is connected to the bottle attachment portion 2. In greater detail, when viewed from the rotation axis direction AD, a plurality of sealing-breaker projections 22 are arranged in a circle centered on a point on the inner bottom of the bottle attachment portion 2 at the position of the rotation axis A, as illustrated in FIG. 3 and FIG. 4A. The plurality of sealing-breaker projections 22 arranged in a circle are continuous, with no gap therebetween, and the outer diameter of the sealing-breaker projections 22 arranged in a circle is slightly smaller than the inner diameter of the opening surface of the bottle opening 31.

Figure 4B:
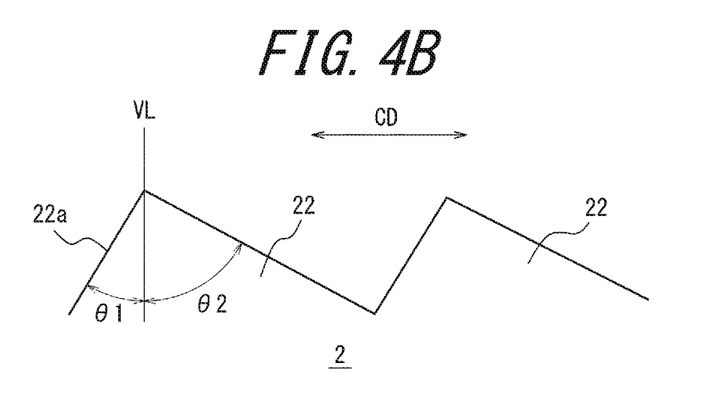

As illustrated in FIG. 3 and FIG. 4B, the sealing-breaker projections 22 are triangular blades when viewed from a direction (radial direction DD) orthogonal to the rotation axis direction AD (when viewing outward from the rotation axis side). Specifically, during relative rotation of the bottle attachment portion 2 when the bottle opening 31 is connected to the bottle attachment portion 2, the blade that forms a sealing-breaker projection 22 is a single-edged blade, the front side of which in the relative rotation direction acts as a cutting portion 22a (i.e. only one inclined portion of the triangular blade is the cutting portion 22a). Furthermore, as seen from the radial direction DD, the triangular shape of the sealing-breaker projection 22 is asymmetrical relative to a virtual line VL parallel to the rotation axis direction AD and passing through the apex of the triangle. In the illustrated example, of the two sides of the triangle on either side of the virtual line VL, the steeply inclined portion with a small inclination angle $\theta 1$ relative to the virtual line VL in the asymmetrical triangle (a steep incline relative to the circumferential direction CD) is the single edge forming the cutting portion 22a. Furthermore, of the two sides of the triangle on either side of the virtual line VL, the gently inclined portion with a large inclination angle $\theta 2$ relative to the virtual line VL in the asymmetrical triangle (a gentle incline relative to the circumferential direction CD) is thicker than the cutting portion 22a.

Figure 5:
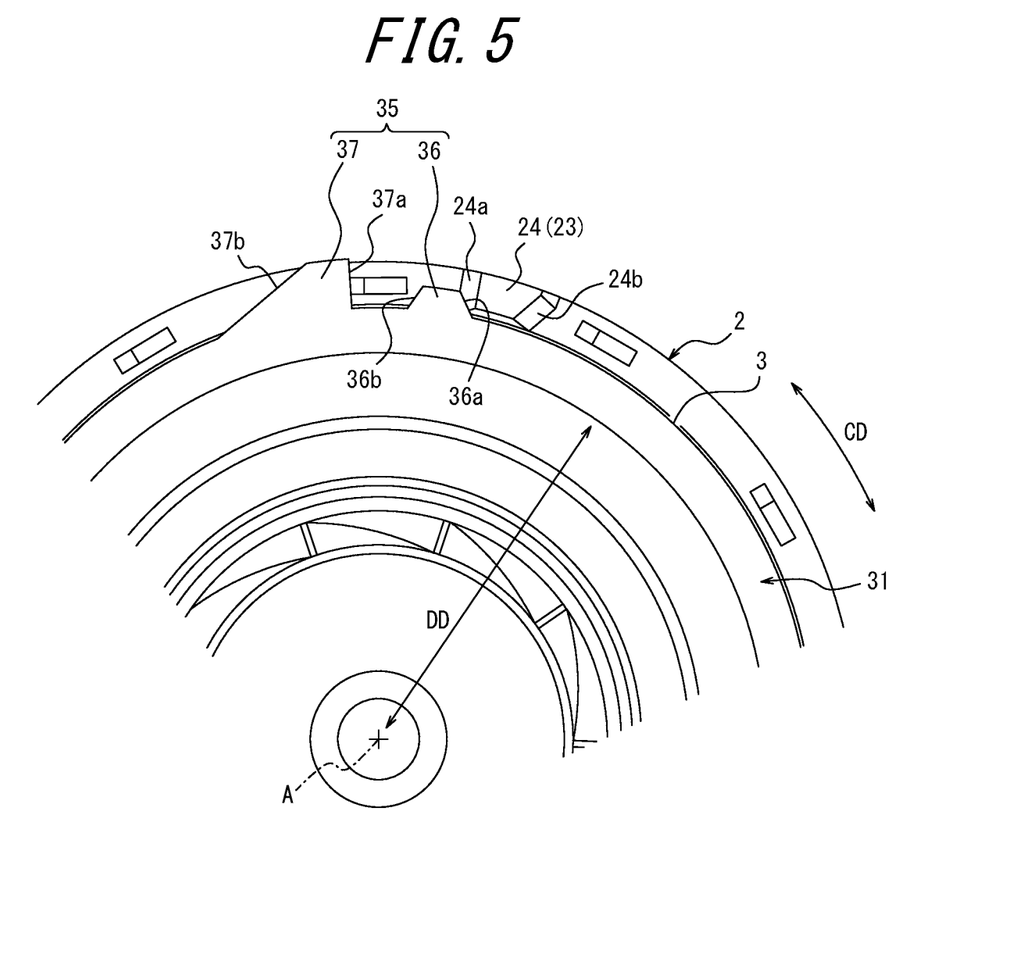
FIG. 5 is a partial cutaway diagram for the flat-tire repair kit in FIG. 2, illustrating an enlargement, from a direction orthogonal to the rotation axis direction, of a bottle-side engagement portion of the bottle opening and an attachment-side engagement portion of the bottle attachment portion in a state immediately before engagement.

As illustrated in FIG. 5, the bottle opening 31 and the bottle attachment portion 2 respectively include a bottle-side engagement portion 35 and attachment-side engagement portions 23. After the sealing-breaker projections 22 break the sealing member 34, the bottle-side engagement portion 35 engages with the attachment-side engagement portion 23, thereby preventing the bottle opening 31 from relatively rotating in the opposite rotation direction from the rotation direction when the bottle opening 31 is screwed onto the bottle attachment portion 2. Similarly, after the sealing-breaker projections 22 break the sealing member 34, the attachment-side engagement portion 23 engages with the bottle-side engagement portion 35, thereby preventing the bottle opening 31 from relatively rotating in the opposite rotation direction from the rotation direction when the bottle opening 31 is screwed onto the bottle attachment portion 2.

Specifically, in the example illustrated in FIG. 5 (in the example viewed from the bottle side in the rotation axis direction AD, where the relative rotation direction of the bottle opening 31 is clockwise), the bottle-side engagement portion 35 is formed by a first projection 36 and a second projection 37 each projecting outward in the radial direction DD from the outer circumferential surface of the bottle opening 31. The first projection 36 is positioned further forward in the relative rotation direction of the bottle opening 31 than the second projection 37. The first projection 36 includes a first front-side portion 36a at the front side and a first back-side portion 36b at the back side thereof. The projection height of the first front-side portion 36a outward in the radial direction DD from the outer circumferential surface of the bottle opening 31 gradually increases from the front side toward the back side. The projection height of the first back-side portion 36b decreases more rapidly than the degree of increase in the height of the first front-side portion 36a.

The second projection 37 is positioned at a distance from the first projection 36 and has a height in the circumferential direction CD such that the below-described third projection 24 fits between the first projection 36 and the second projection 37. The second projection 37 includes a second front-side portion 37a, at the front side, with a projection height that abruptly increases from the outer circumferential surface of the bottle opening 31 (the second front-side portion 37a is roughly perpendicular to the circumferential direction CD), and includes a second back-side portion 37b, at the back side, with a projection height that decreases gradually from the front side toward the back side.

In the example illustrated in FIG. 5 (in the example viewed from the bottle side in the rotation axis direction AD, where the relative rotation direction of the bottle attachment portion 2 is counterclockwise), the attachment-side engagement portion 23 is formed by a third projection 24. In this example, the third projection 24 is provided on the smooth open end of the bottle attachment portion 2 and projects toward the opening side in the rotation axis direction. At the front side in the relative rotation direction of the bottle attachment portion 2, the third projection 24 includes a third front-side portion 24a roughly perpendicular to the circumferential direction CD (the relative rotation direction), and at the back side, the third projection 24 includes a third back-side portion 24b inclined outward in the radial direction DD from the front side towards the back side. As viewed from the bottle side in the rotation axis direction AD, the third projection 24 is provided so as not to project from the inner circumferential surface of the bottle attachment portion 2.

In a state in which the bottle opening 31 and the bottle attachment portion 2 are connected by being screwed together, the first projection 36 and second projection 37 serving as the bottle-side engagement portion 35 and the third projection 24 serving as the attachment-side engagement portion 23 are positioned so as to overlap in the circumferential direction CD (the relative rotation direction), at the same positions in the rotation axis direction AD in the illustrated example. As illustrated in the diagram immediately before engagement in FIG. 5, when the bottle opening 31 and the bottle attachment portion 2 have been screwed together, the first projection 36 and the third projection 24 are at partially overlapping positions in the circumferential direction CD. Specifically, the radially outer end of the first projection 36 is positioned further outward in the radial direction DD than the radially inner end of the third projection 24. Furthermore, the second projection 37 and the third projection 24 are at positions overlapping more in the circumferential direction CD than the overlap between the first projection 36 and the third projection 24. Specifically, the radially outer end of the second projection 37 is positioned further outward in the radial direction DD than the radially outer end of the first projection 36 and the radially inner end of the third projection 24.

The first back-side portion 36b of the first projection 36 and the third back-side portion 24b of the third projection 24, along with the second front-side portion 37a of the second projection 37 and the third front-side portion 24a of the third projection 24, are inclined so that their respective surfaces correspond to each other (in the illustrated example, these portions are inclined in the rotation axis direction AD and in the radial direction DD). Furthermore, the first projection 36 and the second projection 37 are positioned so that the third projection 24 ends up positioned therebetween in the relative rotation direction.

Accordingly, in the example in FIG. 5, when viewed from the bottle side in the rotation axis direction AD, the third projection 24 passes over the first projection 36 to engage between the first projection 36 and the second projection 37 when the bottle-side engagement portion 35 and the attachment-side engagement portion 23 are engaged. The second front-side portion 37a of the second projection 37 and the third front-side portion 24a of the third projection 24 overlap in the circumferential direction CD (the second projection 37 and the third projection 24 overlap in the relative rotation direction) and are perpendicular to the circumferential direction CD. Therefore, after the bottle-side engagement portion 35 and the attachment-side engagement portion 23 engage, further screwing produces no relative rotation in the rotation direction. Furthermore, the first back-side portion 36b of the first projection 36 is inclined more relative to the circumferential direction CD than the first front-side portion 36a, thereby preventing the user from relatively rotating the bottle opening 31 in the opposite rotation direction from the rotation direction when the bottle opening 31 is screwed on.

In this example, as illustrated in FIG. 4A and FIG. 5, one pair of the first projection and second projection and three of the third projections are provided, but any number may be provided. Furthermore, the second projection need not be provided. When the bottle-side engagement portion 35 and the attachment-side engagement portion 23 in the illustrated example are engaged, the engagement portions 35, 23 prevent the bottle opening 31 from rotating in the opposite rotation direction from the rotation direction when the bottle opening 31 is screwed onto the bottle attachment portion 2. However, by applying a large force in the opposite rotation direction, for example, the user can relatively rotate the bottle opening 31 and the bottle attachment portion 2 in the opposite rotation direction. In other words, stating that the "bottle opening 31 is prevented from relative rotation in the opposite rotation direction" includes not only the case of relative rotation in the opposite rotation direction being completely prevented, but also, for example, the case of relative rotation not occurring in the opposite rotation direction unless a relatively large force is applied.

In the flat-tire repair kit 1 of the present embodiment, the bottle opening 31 and the bottle attachment portion 2 are connected by being relatively rotated and screwed together. The operating state of the bottle opening 31 and the bottle attachment portion 2, the connection state of each, and the torque produced by relative rotation in this flat-tire repair kit 1 are described with relation to the relative rotation angle of the bottle opening 31 and the bottle attachment portion 2, using FIGS. 6A to 6C, from the start of screwing the bottle opening 31 and the bottle attachment portion 2 together until the bottle-side engagement portion 35 and the attachment-side engagement portion 23 are engaged.

Figure 6A:
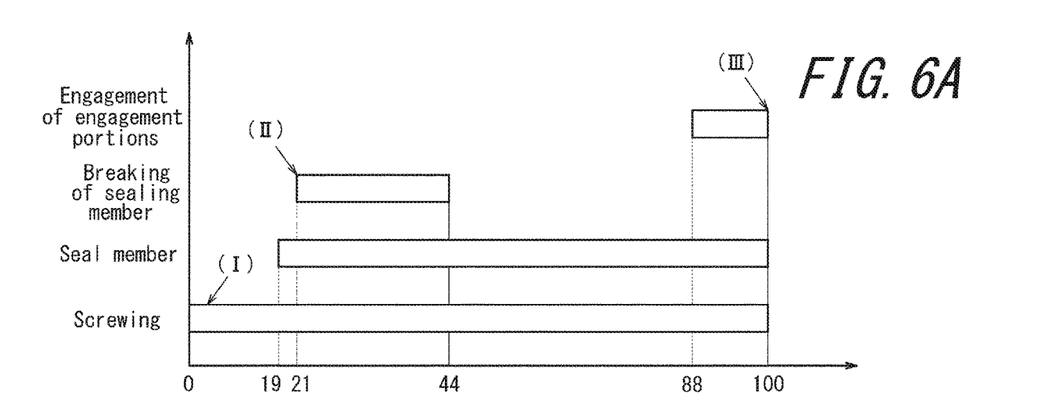
FIG. 6A illustrates, for the flat-tire repair kit in FIG. 2, the operating state of the bottle opening and the bottle attachment portion, with relation to the relative rotation angle of the bottle opening and the bottle attachment portion, from the start of screwing of the bottle opening and the bottle attachment portion until the bottle-side engagement portion and the attachment-side engagement portion are engaged.

The graph in FIG. 6A illustrates the operating state (timing chart) of the bottle opening 31 and the bottle attachment portion 2 in this flat-tire repair kit 1 after the bottle opening 31 and the bottle attachment portion 2 start to be screwed together until the bottle-side engagement portion 35 and the attachment-side engagement portion 23 are engaged. Specifically, the horizontal axis represents the relative rotation degree, and the vertical axis represents each constituent member of the bottle opening 31 and the bottle attachment portion 2. The horizontal bars in the graph indicate how each constituent member satisfies a predetermined function at a predetermined relative rotation angle. The cross-sectional diagram of the bottle opening 31 and the bottle attachment portion 2 in FIG. 6B illustrates the connection state of each constituent member in a predetermined screwing state of the bottle opening 31 onto the bottle attachment portion 2.

The total rotation angle of the relative rotation of the bottle opening 31 relative to the bottle attachment portion 2 is taken to be 100 from the start of the bottle opening 31 and the bottle attachment portion 2 being screwed together until the bottle-side engagement portion 35 and the attachment-side engagement portion 23 are engaged (in the illustrated example, the screw shape is three-threaded, the total rotation angle is approximately 160°, and the rotation angle (°) per unit stroke (mm) is 24 (°/mm).

Figure 6B:
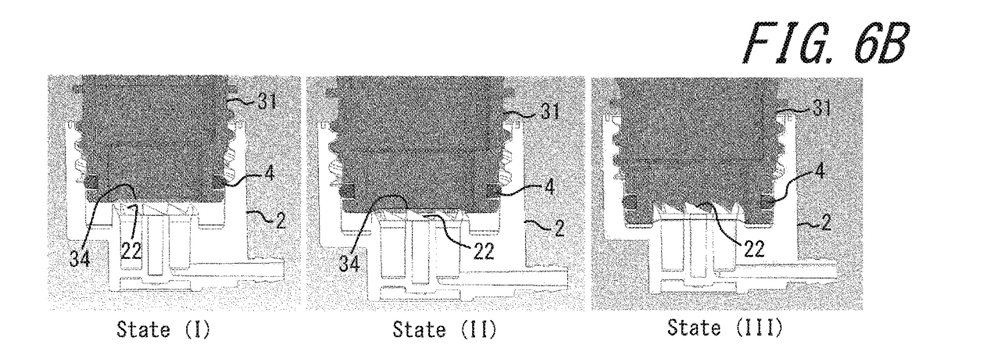
FIG. 6B illustrates the connection state between the bottle opening and the bottle attachment portion at each connection stage.

State (I) in FIG. 6B is the state immediately after the bottle opening 31 and the bottle attachment portion 2 start to be screwed together. After state (I), and until state (II), the seal member 4 starts to make the connection liquid-tight (in the illustrated example, the seal member 4 attached to the bottle opening 31 is inserted between the bottle opening 31 and the inner circumferential surface of the bottle attachment portion 2 and closely adheres to the inner circumferential surface). The rotation angle of relative rotation after the start of screwing until the seal member 4 starts to make the connection liquid-tight can be set to be 15 to 25 relative to the total rotation angle (in the illustrated example, this rotation angle is 19 relative to the total rotation angle).

State (II) in FIGS. 6A and 6B is the state in which, after the seal member 4 attached to the bottle opening 31 has closely adhered to the inner circumferential surface of the bottle attachment portion 2, the sealing-breaker projections 22 provided on the inner bottom of the bottle attachment portion 2 contact the sealing member 34 provided on the open end of the bottle opening 31. The rotation angle of relative rotation after the start of screwing until the sealing-breaker projections 22 contact the sealing member 34 can be set to be 20 to 35 relative to the total rotation angle (in the illustrated example, this rotation angle is 21 relative to the total rotation angle). Furthermore, the rotation angle until breaking of the sealing member 34 is complete depends on the number of sealing-breaker projections 22 that are provided but can be set to be 35 to 80 relative to the total rotation angle (in the illustrated example, this rotation angle is 44 relative to the total rotation angle).

State (III) in FIGS. 6A and 6B is the state in which the sealing-breaker projections 22 have finished breaking the sealing member 34, and moreover, the bottle-side engagement portion 35 and the attachment-side engagement portion 23 are engaged. The rotation angle of relative rotation after the start of screwing until the bottle-side engagement portion 35 and the attachment-side engagement portion 23 start to engage (the state illustrated in FIG. 5) can be set to be 60 to 95 relative to the total rotation angle (in the illustrated example, this rotation angle is 88 relative to the total rotation angle). In state (III) in FIGS. 6A and 6B, the rotation angle of relative rotation is 100.

Figure 6C:
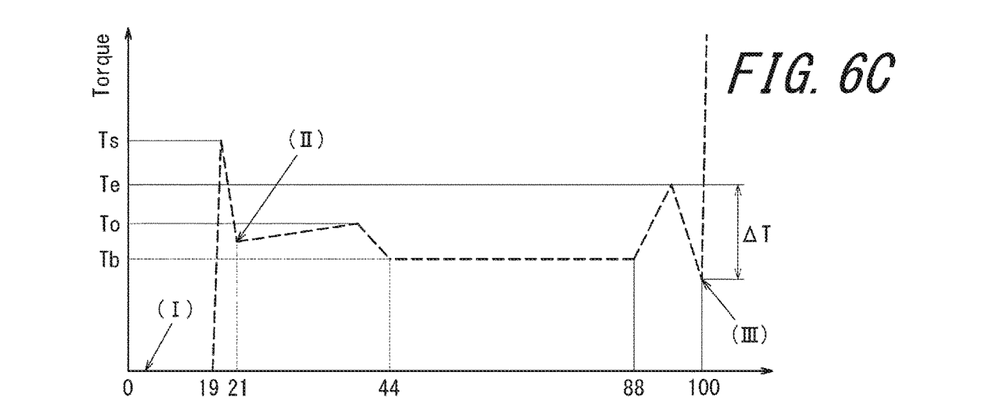
FIG. 6C illustrates torque, produced when rotating the bottle opening relative to the bottle attachment portion, with relation to the relative rotation angle of the bottle opening and the bottle attachment portion.

Next, in the flat-tire repair kit 1 of the present embodiment, the torque (N·m) produced by rotation of the bottle opening 31 relative to the bottle attachment portion 2 is described with relation to the relative rotation angle, using FIG. 6C, for the time after the bottle opening 31 and the bottle attachment portion 2 start to be screwed together until the bottle-side engagement portion 35 and the attachment-side engagement portion 23 are engaged.

The graph in FIG. 6C illustrates the fluctuation in torque (load torque; i.e. the torque necessary for relative rotation) produced by relative rotation after the start of screwing until the bottle-side engagement portion 35 and the attachment-side engagement portion 23 are engaged. Specifically, the horizontal axis represents the relative rotation angle, and the vertical axis represents the torque value (N·m).

As illustrated in FIG. 6C, the torque fluctuates as follows from the start of the bottle opening 31 and the bottle attachment portion 2 being screwed together until state (II) is reached, i.e. after the start of screwing and until the seal member 4 attached to the bottle opening 31 becomes closely adhered to the inner circumferential surface of the bottle attachment portion 2 and the sealing-breaker projections 22 start to contact the sealing member 34.

Until the seal member 4 starts to adhere closely to the inner circumferential surface of the bottle attachment portion 2, only relative rotation for screwing components together takes place. Hence, nearly no load is produced, and the torque is nearly 0 (N·m). In the state immediately after the seal member 4 starts to adhere closely to the inner circumferential surface of the bottle attachment portion 2, a large load is suddenly produced, as illustrated in the graph, and the maximum torque Ts is produced when the seal member 4 adheres closely to the inner circumferential surface of the bottle attachment portion 2. Subsequently, once the seal member 4 enters a state of close adhesion to the inner circumferential surface of the bottle attachment portion 2 and the sealing-breaker projections 22 start to contact the sealing member 34, the aforementioned large load subsides. For some time from state (II) onwards, the torque is mainly for resisting the friction when the seal member 4 slides against the inner circumferential surface of the bottle attachment portion 2.

The torque fluctuates as follows from the state in which the sealing-breaker projections 22 in state (II) start to contact the sealing member 34 provided on the open end of the bottle opening 31 until the state in which the bottle-side engagement portion 35 and the attachment-side engagement portion 23 start to engage (the state illustrated in FIG. 5, and the state in which the relative rotation angle is 88 in FIG. 6A and FIG. 6C).

From the time the sealing-breaker projections 22 start to contact the sealing member 34 until the sealing-breaker projections 22 finish breaking the sealing member 34, friction is produced as the seal member 4 slides against the inner circumferential surface of the bottle attachment portion 2, as described above. Moreover, a load for the sealing-breaker projections 22 to break the sealing member 34 (in the illustrated example, to cut open with a blade) is produced. The torque increases gradually from the early to middle stages of this seal breaking, reaching a maximum torque To produced when the sealing-breaker projections 22 break the sealing member 34, and decreases gradually in the later stage of seal breaking. Until the sealing-breaker projections 22 finish breaking the sealing member 34 and the bottle-side engagement portion 35 and attachment-side engagement portion 23 start to engage, the torque is almost entirely for resisting friction of the seal member 4. The torque produced after the sealing-breaker projections 22 break the sealing member 34 and up to when the bottle-side engagement portion 35 and attachment-side engagement portion 23 are engaged is a torque Tb (in this example, the torque for this duration is roughly constant). The torque Tb indicates the average torque from when the sealing-breaker projections 22 finish breaking the sealing member 34 until the bottle-side engagement portion 35 and attachment-side engagement portion 23 start to engage.

The torque fluctuates as follows from the state in which the bottle-side engagement portion 35 and attachment-side engagement portion 23 start to engage until state (III) in which the bottle-side engagement portion 35 and attachment-side engagement portion 23 are (completely) engaged.

Once the bottle-side engagement portion 35 and attachment-side engagement portion 23 start to engage, a large load is suddenly produced for engaging the engagement portions, and the torque becomes the maximum torque Te produced when engaging the bottle-side engagement portion 35 and attachment-side engagement portion 23. Specifically, in the example in FIG. 5, the torque becomes the maximum torque Te for the first projection 36 of the bottle-side engagement portion 35 to pass over the third projection 24 of the attachment-side engagement portion 23. Once the first projection 36 passes over the third projection 24 in the example in FIG. 5, the engagement portions become (completely) engaged, and the torque greatly decreases.

Accordingly, in the flat-tire repair kit 1, the maximum torque Te produced when engaging the bottle-side engagement portion 35 and the attachment-side engagement portion 23 is the largest torque apart from the maximum torque Ts produced when starting to make the connection liquid-tight with the seal member 4 (in the illustrated example, when the seal member 4 closely adheres to the inner circumferential surface of the bottle attachment portion 2), as illustrated in FIG. 6C. Furthermore, the maximum torque To produced when breaking the sealing member 34 with the sealing-breaker projections 22 is smaller than the maximum torque Te produced when engaging the bottle-side engagement portion 35 and the attachment-side engagement portion 23 and is slightly larger than the torque Tb after the sealing member 34 is broken with the sealing-breaker projections 22 and up to when the bottle-side engagement portion 35 and attachment-side engagement portion 23 are engaged. Since the solution needs to be prevented from leaking by the seal member 4, a roughly constant torque (torque Tb) apart from the maximum torque Ts is continuously produced due to friction of the seal member 4, as illustrated in FIG. 6C.

The operations and effects of the flat-tire repair kit 1 according to the present embodiment are now described.

In the flat-tire repair kit 1 of the present embodiment, the bottle-side engagement portion 35 and the attachment-side engagement portion 23 prevent relative rotation in the opposite rotation direction from the rotation direction when components are screwed together, allowing a more reliable connection between the bottle 3 and the bottle attachment portion 2. Furthermore, after the sealing-breaker projections 22 break the sealing member 34, the bottle 3 containing the flat-tire repair solution is connected to the bottle attachment portion 2 by engaging the bottle-side engagement portion 35 and attachment-side engagement portion 23. Hence, the user can feel the load during this engagement. When connecting the bottle 3 to the bottle attachment portion 2, the user can thus clearly recognize whether the connection is complete. Consequently, the reliability of the connection when connecting the bottle 3 to the bottle attachment portion 2 can be increased.

By providing the bottle 3 containing the flat-tire repair solution and the bottle attachment portion 2 in the present disclosure, the bottle 3 can be stored separately. Therefore, as compared to a flat-tire repair kit in which a bottle containing flat-tire repair solution is provided integrally, the present disclosure also has the advantage of being able to omit a member for forming the bottle integrally, reducing the cost of the flat-tire repair kit and allowing efficient production.

As illustrated in FIG. 5, the bottle attachment portion 2 preferably includes the attachment-side engagement portion 23 at the open end of the bottle attachment portion 2. With this configuration, the user can visually confirm the engagement between the bottle-side engagement portion 35 and the attachment-side engagement portion 23, further increasing the reliability of the connection when connecting the bottle 3 to the bottle attachment portion 2.

The maximum torque To produced when breaking the sealing member 34 with the sealing-breaker projections 22 is preferably smaller than the maximum torque Te produced when engaging the bottle-side engagement portion 35 and the attachment-side engagement portion 23. With this configuration, the bottle 3 and the bottle attachment portion 2 are completely connected, after the sealing-breaker projections 22 break the sealing member 34, by the engagement portions engaging to produce the maximum torque Te that is greater than the maximum torque To. This makes it easier for the user to recognize completion of the connection, thereby further increasing the reliability of the connection.

In the flat-tire repair kit 1, the sealing-breaker projections 22 are preferably configured as follows to effectively reduce the load, and the fluctuation thereof, on the user when breaking the sealing member 34 with the sealing-breaker projections 22, to make it easier for the user to recognize the load produced when the bottle-side engagement portion 35 and attachment-side engagement portion 23 engage, and to further increase the reliability of the connection when connecting the bottle 3 to the bottle attachment portion 2. If the load, and the fluctuation thereof, on the user when breaking the sealing member 34 is large, it might be more difficult for the user to recognize the load produced when the engagement portions engage. Configuring the sealing-breaker projections 22 as follows facilitates achievement of the above-described relationships between the maximum torques To and Te and the torque Tb.

Specifically, as illustrated in FIGS. 3, 4A, and 4B, the sealing-breaker projections 22 are preferably triangular blades as viewed from the radial direction DD. Forming the sealing-breaker projections 22 as triangular blades allows a reduction in the load, and the fluctuation thereof, on the user when breaking the sealing member 34 with the sealing-breaker projections 22.

The angle ($\theta 1 + \theta 2$) of the apex of the triangle is more preferably in a range of 90° to 150°. Such a setting allows the sealing-breaker projections 22 to break the sealing member 34 initially with a smaller load while preventing the apex from being excessively acute, thus achieving a configuration that is safe for the user.

If the sealing-breaker projections 22 deform, for example by warping, when breaking (rupturing) the sealing member 34, then a load is produced, and the torque might increase or fluctuate. The sealing-breaker projections 22 are therefore preferably single-edged. With such a configuration, deformation of the sealing-breaker projections 22 can be suppressed.

When the sealing-breaker projections 22 are triangular, the triangular shape as seen from the radial direction DD is preferably asymmetrical relative to a virtual line VL parallel to the rotation axis direction AD and passing through the apex of the triangle. If a steeply inclined portion with a small inclination angle relative to the virtual line VL in the asymmetrical triangle is positioned at the front in the relative rotation direction of the sealing-breaker projection 22, then with the above configuration, the movement direction of the steeply inclined portion when the sealing-breaker projections 22 break the sealing member 34 is closer to being a right angle relative to the inclination of the steeply inclined portion (the movement direction being slightly inclined toward the rotation axis direction AD relative to the circumferential direction CD, because the bottle opening 31 and the bottle attachment portion 2 are screwed together). Therefore, the deformation of the sealing-breaker projections 22 when breaking the sealing member 34 can be further suppressed, and fluctuation in the load on the user when breaking the sealing member 34 with the sealing-breaker projections 22 can be reduced.

From a similar perspective, an inclination angle $\theta 1$ of the steeply inclined portion relative to the virtual line VL parallel to the rotation axis direction AD is preferably 30° to 50°, and an inclination angle $\theta 2$ relative to the virtual line VL in a gently inclined portion, where the inclination angle θ2 relative to the virtual line VL is large, is preferably 60° to 100°.

Furthermore, as illustrated in FIG. 4A, a plurality of the sealing-breaker projections 22 is preferably arranged in a circle as viewed from the opening side in the rotation axis direction. With such a configuration, the load on the user when opening the sealing member 34 with the sealing-breaker projections 22 can be made uniform.

To reduce the load on the user, the plurality of sealing-breaker projections 22 arranged in a circle also preferably have an outer diameter that is slightly smaller than the inner diameter of the opening surface of the bottle opening 31. If the aforementioned outer diameter is too close to the aforementioned inner diameter, however, the sealing-breaker projections 22 might interfere with the opening surface of the bottle opening 31.

As illustrated in FIG. 4A and the like, a plurality of the sealing-breaker projections 22 is preferably provided, with 3 or more being more preferably provided. Providing 2 or fewer sealing-breaker projections 22 increases the risk of the sealing-breaker projections 22 deforming, for example by warping. The number of sealing-breaker projections 22 is still more preferably 3 to 10. Providing too many sealing-breaker projections 22 increases the number of locations where the sealing member 34 is broken simultaneously, which might increase the torque required from the user.

When providing a plurality of sealing-breaker projections 22, the sealing-breaker projections 22 are preferably arranged continuously, with no gap therebetween. This can suppress deformation, such as warping, of the sealing-breaker projections 22 when breaking the sealing member 34.

In the flat-tire repair kit 1 of the present embodiment, the operational relationship between the bottle opening 31 and the bottle attachment portion 2 is preferably as follows after the start of screwing and until the bottle-side engagement portion 35 and attachment-side engagement portion 23 are engaged. Note that the total rotation angle of the relative rotation of the bottle opening 31 relative to the bottle attachment portion 2 is taken to be 100 from the start of the bottle opening 31 and the bottle attachment portion 2 being screwed together until the bottle-side engagement portion 35 and the attachment-side engagement portion 23 are engaged.

The rotation angle of relative rotation after the start of screwing until the seal member 4 starts to make the connection liquid-tight is preferably 15 to 25 relative to the total rotation angle, the rotation angle of relative rotation after the start of screwing until the sealing-breaker projections 22 contact the sealing member 34 is preferably 20 to 35 relative to the total rotation angle, and the rotation angle of relative rotation after the start of screwing until the bottle-side engagement portion 35 and the attachment-side engagement portion 23 start to engage is preferably 60 to 95 relative to the total rotation angle. With such a configuration, the reliability of the connection when connecting the bottle 3 to the bottle attachment portion 2 can be increased.

Specifically, if the seal member 4 starts to make the connection liquid-tight immediately after the start of screwing, screwing of the bottle opening 31 onto the bottle attachment portion 2 might be distorted. However, setting the rotation angle of relative rotation after the start of screwing until the seal member 4 starts to make the connection liquid-tight to 15 or more can prevent the occurrence of such distortion. Also, setting the rotation angle of relative rotation after the start of screwing until the seal member 4 starts to make the connection liquid-tight to 25 or less can prevent erroneous operation by the user due to the rotation angle being too large. Specifically, the user can be prevented from mistaking the maximum torque Ts produced when the seal member 4 starts to make the connection liquid-tight for the maximum torque Te produced when the engagement members engage.

Setting the rotation angle of relative rotation after the start of screwing until the sealing-breaker projections 22 contact the sealing member 34 to 20 or more places the bottle opening 31 in a state of being screwed to the bottle attachment portion 2 to a certain degree, thus preventing the contact between the sealing-breaker projections 22 and the sealing member 34 and the breaking of the sealing member 34 from being unsteady. Also, setting this rotation angle to 35 or less increases the number of rotations until the sealing member 34 is broken, and increasing this number of rotations can decrease the maximum torque To.

Furthermore, by setting the rotation angle of relative rotation after the start of screwing until the engagement portions start to engage to 60 or more, the time until the engagement portions start to engage and enter an engaged state is not excessively long, which prevents the period in which a large torque is required from becoming too long and increases usability. Also, by setting this rotation angle to 95 or less, the time until the engagement portions start to engage and enter an engaged state is not excessively short, thereby allowing the user ample opportunity to recognize that the engagement portions are engaged.

Embodiments of the present disclosure have been described with reference to the drawings. However, the flat-tire repair kit of the present disclosure is not limited to the above example, and appropriate changes may be made. As a specific example, the bottle opening and the bottle attachment portion are made of resin in the illustrated example, but these components may be made of any material, such as metal.

INDUSTRIAL APPLICABILITY

According to the present disclosure, a flat-tire repair kit that can increase the reliability of the connection when connecting the bottle to the bottle attachment portion can be provided.

REFERENCE SIGNS LIST

1 Flat-tire repair kit
11 Case
12 Pressure resistant hose
13 Connecting pipe
14 Cigar plug
15 Motor
16 Cylinder
17 Gauge
18 Cable storage space
19 Hose connector
2 Bottle attachment portion
21 Attachment-side screw portion
22 Sealing-breaker projection
22*a* Cutting portion
23 Attachment-side engagement portion
24 Third projection
24*a* Third front-side portion
24*b* Third back-side portion
3 Bottle
31 Bottle opening
32 Main body 33 Bottle-side screw portion
34 Sealing member
35 Bottle-side engagement portion
36 First projection
36a First front-side portion
36b First back-side portion
37 Second projection
37a Second front-side portion
37b Second back-side portion
4 Seal member
A Rotation axis
AD Rotation axis direction
DD Radial direction
CD Circumferential direction
VL Virtual line parallel to rotation axis direction and passing through apex of triangle
Ts, To, Te Maximum torque
Tb Torque
ΔT Difference in torque

The invention claimed is:

1. A flat-tire repair kit comprising:
a bottle containing a flat-tire repair solution; and
a bottle attachment portion to which a bottle opening of the bottle is connectable by being relatively rotated to screw the bottle opening and the bottle attachment portion together; wherein
the bottle opening includes a sealing member configured to seal the solution inside the bottle,
the bottle opening or the bottle attachment portion includes a seal member configured to make a connection of the bottle opening to the bottle attachment portion liquid-tight after the bottle opening starts to be rotated relative to the bottle attachment portion,
the bottle attachment portion includes a sealing-breaker projection configured to contact and break the sealing member after the seal member starts to make the connection liquid-tight, and
the bottle opening includes a bottle-side engagement portion configured to engage with an attachment-side engagement portion, included in the bottle attachment portion, after the sealing-breaker projection breaks the sealing member, so as to prevent the bottle opening from relatively rotating in an opposite rotation direction from a rotation direction when the bottle opening is screwed onto the bottle attachment portion;
the bottle attachment portion includes the attachment-side engagement portion at a smooth open end of the bottle attachment portion; and
the attachment-side engagement portion projects toward an opening side in the rotation axis direction.

2. The flat-tire repair kit of claim 1, wherein
a total rotation angle of relative rotation of the bottle opening relative to the bottle attachment portion a start of the bottle opening and the bottle attachment portion being screwed together until the bottle-side engagement portion and the attachment-side engagement portion are engaged is 100%,
a rotation angle of relative rotation after the start of screwing until the seal member starts to make the connection liquid-tight is 15 to 25% of the total rotation angle,
the rotation angle of relative rotation after the start of screwing until the sealing-breaker projection contacts the sealing member is 20 to 35% of the total rotation angle, and
the rotation angle of relative rotation after the start of screwing until the bottle-side engagement portion and the attachment-side engagement portion start to engage is 60 to 95% of the total rotation angle.

3. The flat-tire repair kit of claim 2, wherein the sealing-breaker projection is a blade with a triangular shape as viewed from a direction orthogonal to a rotation axis direction in which the bottle opening is rotated relative to the bottle attachment portion.

4. The flat-tire repair kit of claim 2, wherein the bottle attachment portion includes 3 or more of the sealing-breaker projections.

5. The flat-tire repair kit of claim 2, wherein a maximum torque produced when the sealing-breaker projection breaks the sealing member is smaller than a maximum torque produced when the bottle-side engagement portion and the attachment-side engagement portion are engaged.

6. The flat-tire repair kit of-claim 1, wherein the sealing-breaker projection is a blade with a triangular shape as viewed from a direction orthogonal to a rotation axis direction in which the bottle opening is rotated relative to the bottle attachment portion.

7. The flat-tire repair kit of claim 6, wherein the sealing-breaker projection includes only a single cutting edge.

8. The flat-tire repair kit of claim 7, wherein the sealing-breaker projection is single-edged wherein the triangular shape of the sealing-breaker projection is asymmetrical, when viewed from the direction orthogonal to the rotation axis direction, relative to a virtual line parallel to the rotation axis direction and passing through the apex of the triangular shape.

9. The flat-tire repair kit of claim 6, wherein the triangular shape of the sealing-breaker projection is asymmetrical, when viewed from the direction orthogonal to the rotation axis direction, relative to a virtual line parallel to the rotation axis direction and passing through the apex of the triangular shape.

10. The flat-tire repair kit of claim 6, wherein
a total rotation angle of relative rotation of the bottle opening relative to the bottle attachment portion from a start of the bottle opening and the bottle attachment portion being screwed together until the bottle-side engagement portion and the attachment-side engagement portion are engaged is 100%,
a rotation angle of relative rotation after the start of screwing until the seal member starts to make the connection liquid-tight is 15 to 25% of the total rotation angle,
the rotation angle of relative rotation after the start of screwing until the sealing-breaker projection contacts the sealing member is 20 to 35% of the total rotation angle, and
the rotation angle of relative rotation after the start of screwing until the bottle-side engagement portion and the attachment-side engagement portion start to engage is 60 to 95% of the total rotation angle.

11. The flat-tire repair kit of claim 6, wherein the bottle attachment portion includes 3 or more of the sealing-breaker projections.

12. The flat-tire repair kit of claim 6, wherein the bottle attachment portion includes 3 or more of the sealing-breaker projections.

13. The flat-tire repair kit of claim 6, wherein a maximum torque produced required to break the sealing member by the sealing breaker projection is smaller than a maximum torque produced required to engage the bottle-side engagement portion and the attachment-side engagement portion.

14. The flat-tire repair kit of claim 6, wherein a maximum torque produced when the sealing-breaker projection breaks the sealing member is smaller than a maximum torque produced when the bottle-side engagement portion and the attachment-side engagement portion are engaged.

15. The flat-tire repair kit of claim 1, wherein the bottle attachment portion includes 3 or more of the sealing-breaker projections.

16. The flat-tire repair kit of claim 15, wherein a maximum torque produced when the sealing-breaker projection breaks the sealing member is smaller than a maximum torque produced when the bottle-side engagement portion and the attachment-side engagement portion are engaged.

17. The flat-tire repair kit of claim 1, wherein a maximum torque produced required to break the sealing member by the sealing breaker projection is smaller than a maximum torque produced required to engage the bottle-side engagement portion and the attachment-side engagement portion.

18. The flat-tire repair kit of claim 17,
wherein
a total rotation angle of relative rotation of the bottle opening relative to the bottle attachment portion from a start of the bottle opening and the bottle attachment portion being screwed together until the bottle-side engagement portion and the attachment-side engagement portion are engaged is 100%,
a rotation angle of relative rotation after the start of screwing until the seal member starts to make the connection liquid-tight is 15 to 25% of the total rotation angle,
the rotation angle of relative rotation after the start of screwing until the sealing-breaker projection contacts the sealing member is 20 to 35% of the total rotation angle, and
the rotation angle of relative rotation after the start of screwing until the bottle-side engagement portion and the attachment-side engagement portion start to engage is 60 to 95% of the total rotation angle, and
wherein the sealing-breaker projection is a blade with a triangular shape as viewed from a direction orthogonal to a rotation axis direction in which the bottle opening is rotated relative to the bottle attachment portion.

19. The flat-tire repair kit of claim 17,
wherein
a total rotation angle of relative rotation of the bottle opening relative to the bottle attachment portion from a start of the bottle opening and the bottle attachment portion being screwed together until the bottle-side engagement portion and the attachment-side engagement portion are engaged is 100%,
a rotation angle of relative rotation after the start of screwing until the seal member starts to make the connection liquid-tight is 15 to 25% of the total rotation angle,
the rotation angle of relative rotation after the start of screwing until the sealing-breaker projection contacts the sealing member is 20 to 35% of the total rotation angle, and
the rotation angle of relative rotation after the start of screwing until the bottle-side engagement portion and the attachment-side engagement portion start to engage is 60 to 95% of the total rotation angle, and
wherein the bottle attachment portion includes 3 or more of the sealing-breaker projections.

* * * * *